UNITED STATES PATENT OFFICE.

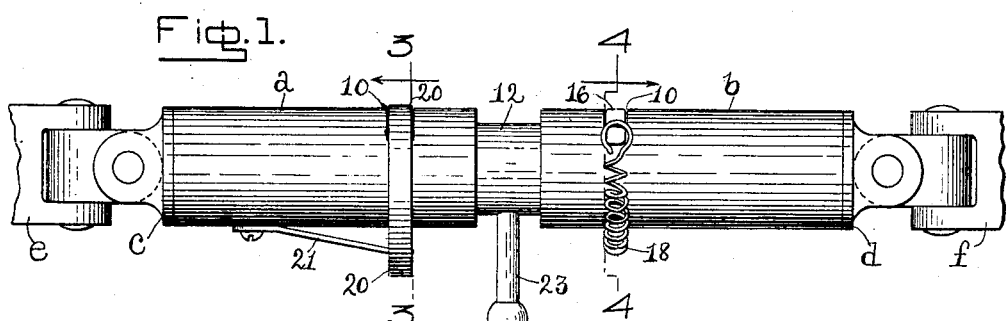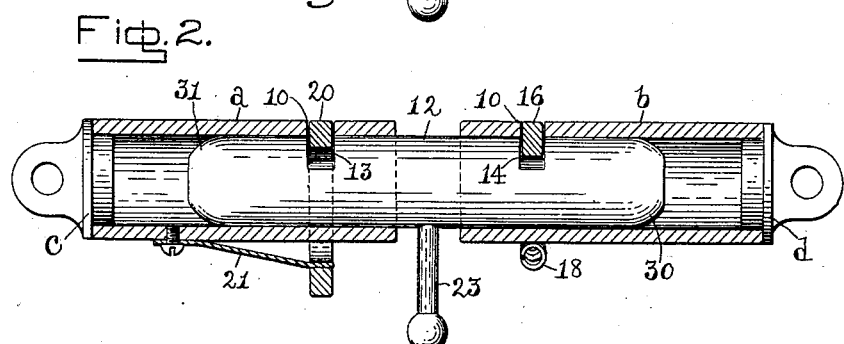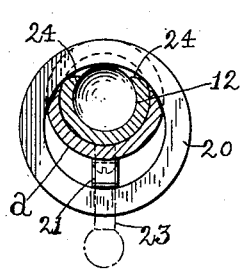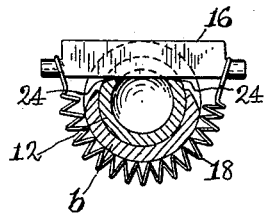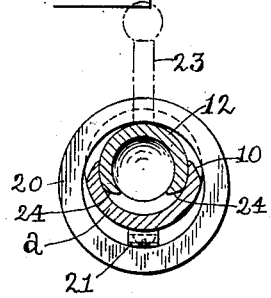

PAUL WINSOR, OF WESTON, MASSACHUSETTS.

CAR-COUPLING.

992,319.　　　　Specification of Letters Patent.　　Patented May 16, 1911.

Application filed May 21, 1910. Serial No. 562,635.

*To all whom it may concern:*

Be it known that I, PAUL WINSOR, a citizen of the United States, residing in Weston, county of Middlesex, and State of Massachusetts, have invented an Improvement in Car-Couplers, of which the following description, in connection with the accompanying drawings, is a specification, like letters on the drawings representing like parts.

This invention relates to a car coupler especially designed and adapted for use on street and other cars employing radial draw-bars.

The invention has for its object to provide a light, strong and efficient coupler, which is capable of being used on street cars having radial draw-bars, and which is so constructed that the members carried by the car need not project from under the car, and which can be securely coupled together and disengaged from each other in a minimum time and with minimum labor.

Figure 1 represents in elevation a coupling device embodying this invention. Fig. 2, a longitudinal section and elevation of the device shown in Fig. 1. Fig. 3, a cross section on the line 3—3, Fig. 1. Fig. 4, a cross section on the line 4—4, Fig. 1, and Fig. 5, a cross section on the line 3—3, Fig. 1, with the parts in the position they occupy ready for disengagement.

Referring to the drawing, *a*, *b*, represent two female members of the coupler, which are cylindrical in cross section and are open at their adjacent ends and closed at their remote ends by the heads *c*, *d*, which are suitably connected with the radial draw-bars *e*, *f*, of street or other cars now commonly in use.

Each of the female members *a*, *b*, is provided in its circumference with a transverse slot 10 for the reception of a locking device for one end of the male member 12, which has its opposite ends extended into said female members.

The male member 12 is preferably made as herein shown and consists of a steel or iron bar or rod of cylindrical shape and solid or hollow as desired, said bar or rod being of substantially the internal diameter of the female members to fit the same snugly, and provided between its ends with transverse slots 13, 14, which are designed to receive the locking devices carried by the members *a*, *b*.

The locking devices may be made in various forms, and in the present instance, I have shown two, one a straight bar 16, which is inserted into the slot 10 in the female member *b* and is thicker than the cylindrical walls of the latter, so that said bar may project within the female member and enter the transverse slot 14 in the male member. The bar 16 is connected with the female member *b* by a helical spring 18, which is passed about the female member and engaged at its opposite ends with the opposite ends of the bar 16 after the manner represented in Fig. 4. The other form of locking device herein shown is a ring 20 of larger diameter than the female member *a* and of sufficient thickness to project into the female member *a*, so as to enter the slot 13 in the male member, with which it is retained in engagement by a flat spring 21, having one end fastened to the female member *a* and its other end engaged with the inner circumference of the locking ring 20, as represented in Figs. 1, 2, 3 and 5.

In Figs. 1 and 2, the coupler is shown in its operative condition, with the female members locked to the male member. When it is desired to uncouple the cars, the operator grasps the handle 23 attached to the male member and rotates the latter in the female members, substantially a half turn and into the position indicated in Fig. 5. As the male member 12 is turned, the locking devices 16, 20, are forced outwardly by one of the end walls 24 of the transverse slots 13, 14, which end walls are preferably curved or inclined so as to act as cams. The male member is turned until the outer circumference of the same is engaged with the locking device, and at such time the male and female members are unlocked, so that the female member *b* can be drawn off of the male member by starting one of the cars forward.

If desired, the male member 12 can be turned back into its locked position in the female member *a* carried by the other car, or it may be withdrawn from the female member *a* by the operator and placed in the car.

When it is desired to couple two cars together, the male member is inserted by the operator into one of the female members, as for instance, the member *a*, with the slot 13 in position to be entered by the locking device 20, and the other female member can then be slipped over the projecting end of the male member, by moving either car toward the other. The smaller rounded ends 30, 31, of the male member 12 serve to automatically force the locking devices outwardly when the male member is inserted into one of the female members and the female member is slipped over the projecting end of the male member.

The coupler herein shown may be made of steel and is substantially light yet strong. Furthermore the female members can be made so as not to project beyond the end of the car, and the male member made of the necessary or desired length to engage the female members.

It will be understood, that either form of locking device may be used with both female members.

The handle 23 may be provided with an enlargement at its end to form a weight which serves to maintain the rotatable male member in its locked position and prevent the accidental rotation of said male member by jars, etc.

Claims.

1. In a car coupler, a hollow cylindrical female member provided with a slot extending from its exterior to its interior, a cylindrical male member extending into and rotatably supported by the female member and provided with a recess capable of registering with the slot in the female member, a locking device carried by the female member and extending through the slot in the female member into the recess in the male member and adapted to be disengaged from the latter by rotating the said male member and bringing the unrecessed portion thereof into engagement with said locking device to force the latter outwardly, and means carried by said female member for yieldingly holding said locking device in its locking position, substantially as described.

2. In a car coupler, a hollow cylindrical female member provided with a slot extending from its exterior to its interior, a cylindrical male member extending into and rotatably supported by the female member and provided with a recess capable of registering with the slot in the female member, a locking device carried by the female member and extending through the slot in the female member into the recess in the male member and adapted to be disengaged from the latter by rotating the said male member and bringing the unrecessed portion thereof into engagement with said locking device to force the latter outwardly therefrom, and a weighted handle extended radially from the rotatable male member and normally depending from said male member to assist in keeping the latter in its locked position, substantially as described.

3. In a car coupler, a hollow female member provided with a slot extending from its exterior to its interior, a male member extending into and rotatably supported by the female member and provided with a recess capable of registering with the slot in the female member, and a locking device carried by the female member and extending through the slot in the female member into the recess in the male member and adapted to be disengaged from the latter by rotating the said male member and bringing the unrecessed portion thereof into engagement with said locking device to force the latter outwardly therefrom, substantially as described.

In testimony whereof, I have signed my name to this specification in the presence of two subscribing witnesses.

PAUL WINSOR.

Witnesses:
J. M. AYER,
CYRUS CORLISS.

---

Copies of this patent may be obtained for five cents each, by addressing the "Commissioner of Patents, Washington, D. C."